United States Patent [19]
Dore et al.

[11] Patent Number: 5,355,368
[45] Date of Patent: Oct. 11, 1994

[54] METHOD FOR ALLOCATING TIME SLOTS FOR TRANSMISSION IN A HALF-DUPLEX TIME DIVISION MULTIPLE ACCESS POINT-TO-MULTIPOINT BIDIRECTIONAL TRANSMISSION NETWORK

[75] Inventors: Pierre Dore, Levallois-Perret; Dany Sallaerts, Anvers; François Marcel, Orsay; Serge Allaire, Beaumont le Roger, all of France

[73] Assignee: Alcatel CIT, Paris, France

[21] Appl. No.: 11,148

[22] Filed: Jan. 29, 1993

[30] Foreign Application Priority Data

Jan. 31, 1992 [EP]  European Pat. Off. ........ 92400264.5

[51] Int. Cl.⁵ .................... H04B 7/212; H04B 7/24
[52] U.S. Cl. ............... 370/95.3; 370/105.1; 359/136; 455/53.1
[58] Field of Search ............ 370/29, 77, 79, 82, 370/85.7, 95.1, 95.3, 100.1, 104.1, 105, 105.1, 105.2, 108, 118; 340/825.2; 455/53.1; 359/113, 115, 135, 136, 140

[56] References Cited

U.S. PATENT DOCUMENTS

| | | | |
|---|---|---|---|
| 4,644,534 | 2/1987 | Sperlich | 370/29 |
| 5,117,423 | 5/1992 | Shepherd et al. | 370/95.1 |
| 5,173,899 | 12/1992 | Ballance | 370/108 |

FOREIGN PATENT DOCUMENTS

| | | |
|---|---|---|
| 0208021 | 1/1987 | European Pat. Off. . |
| 2636482 | 3/1990 | France . |
| 2095516 | 9/1982 | United Kingdom . |

*Primary Examiner*—Douglas W. Olms
*Assistant Examiner*—Hassan Kizou
*Attorney, Agent, or Firm*—Sughrue, Mion, Zinn, Macpeak & Seas

[57] ABSTRACT

In a method of allocating time slots for transmission in a half-duplex time division multiple access point-to-multipoint bidirectional transmission system enabling transmission between a central station and a plurality of remote stations at least one time slot is allocated to each remote station and to each transmission direction. The set of all time slots used for transmission from the central station to the remote stations are grouped into downward frames and the set of all time slots used for transmission from the remote stations to the central station are grouped together in upward frames. The origin time of the upward frame is chosen in each remote station so that in the central station the origin time of the frame is separated from the end time of downward frames by a period less than twice the transmission time between the remote station and the central station, whereby there is defined in the remote station an overlap area between upward and downward frames. The time slots are allocated in such a way as to avoid any coincidence between time slots allocated to the same remote station in the upward and downward frames, respectively, in the overlap area.

13 Claims, 4 Drawing Sheets

METHOD FOR ALLOCATING TIME SLOTS FOR TRANSMISSION IN A HALF-DUPLEX TIME DIVISION MULTIPLE ACCESS POINT-TO-MULTIPOINT BIDIRECTIONAL TRANSMISSION NETWORK

BACKGROUND OF THE INVENTION

1. Field of the Invention

The present invention concerns bidirectional transmission systems.

Half-duplex bidirectional transmission is a technique enabling bidirectional transmission on a single transmission medium in which each terminal station of the transmission system alternately sends and receives.

Depending on the speed at which the signals are transmitted over this medium, it may be necessary to allow for their transmission time and so it may be necessary to provide in the transmission format used periods allowing for these transmission times that cannot be used to transmit information. This is an obvious drawback in that it limits the amount of information that can be transmitted by means of such systems.

An object of the present invention is to avoid this drawback in the case of half-duplex bidirectional transmission systems which are also of the time division multiple access point-to-multipoint type.

The present invention is applicable to half-duplex bidirectional transmission systems of the point-to-multipoint type, i.e. enabling transmission between a central station and a plurality of remote stations, and more particularly to systems of this kind which comprise, between said central station and a concentration point, a transmission medium which is time-shared between the various remote stations, and, between said concentration point and each remote station, a respective transmission medium specific to each remote station and the lengths of which vary according to the location of the remote stations relative to the concentration point.

The present invention is even more specifically concerned with the situation in which said time-sharing of the transmission medium utilizes the TDMA (Time Division Multiple Access) technique with a transmission format structured in frames comprising different time slots assigned in a predetermined manner to respective different remote stations.

The present invention is applicable in particular to distribution networks used in the terminal part (close to the users) of a telecommunication network and particularly to distribution networks of this kind in which said transmission media are optical fibers and said concentration point is a passive optical coupler.

SUMMARY OF THE INVENTION

The present invention consists in a method of allocating time slots for transmission in a half-duplex time division multiple access point-to-multipoint bidirectional transmission system enabling transmission between a central station and a plurality of remote stations, at least one time slot being allocated to each remote station and to each transmission direction, the set of all time slots used for transmission from said central station to said remote stations being grouped into downward frames and the set of all time slots used for transmission from said remote stations to said central station being grouped together in upward frames, in which method the origin time of said upward frame is chosen in each remote station so that in said central station the origin time of said frame is separated from the end time of downward frames by a period less than $T_0$ where $T_0$ is twice the transmission time between said remote station and said central station, whereby there is defined in said remote station an overlap area between upward and downward frames, said time slots being allocated in such a way as to avoid any coincidence between time slots allocated to the same remote station in the upward and downward frames, respectively, in said overlap area.

Other objects and features of the present invention will emerge from the following description of an embodiment thereof with reference to the appended drawings.

DETAILED DESCRIPTION OF THE INVENTION

Figure 1:
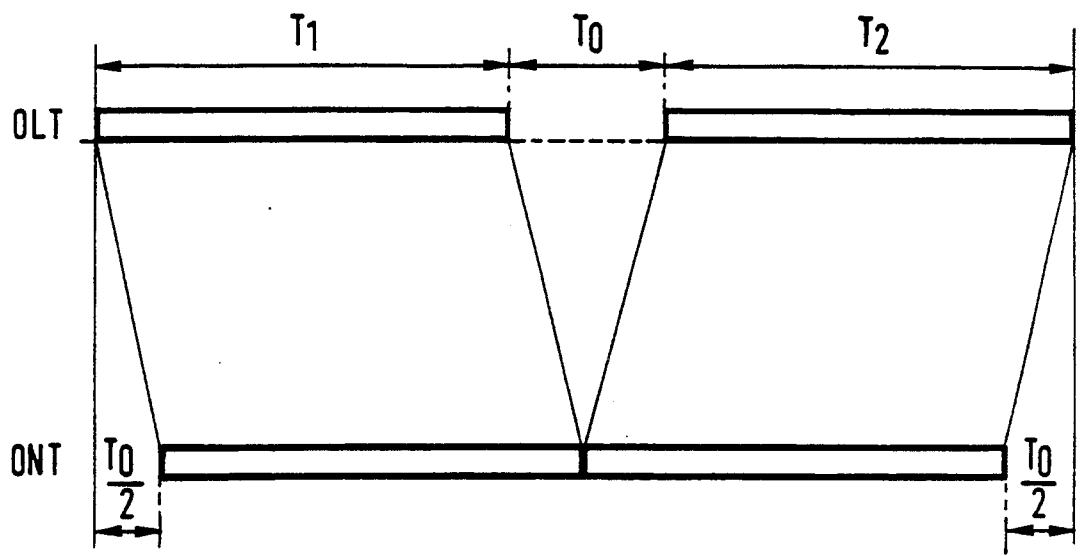
FIG. 1 is a diagram showing the transmission format employed in the prior art in a half-duplex time division multiple access point-to-multipoint bidirectional transmission system.

In FIG. 1, $T_1$ is the duration of a downward frame sent by the central station (OLT) and received by a remote station (ONT). $T_2$ is the duration of an upward frame sent by a remote station and received by the central station. $T_1 = T_2$, for example. $T_0$ is the duration of a period that cannot be used to transmit information, as explained above.

Figure 2:
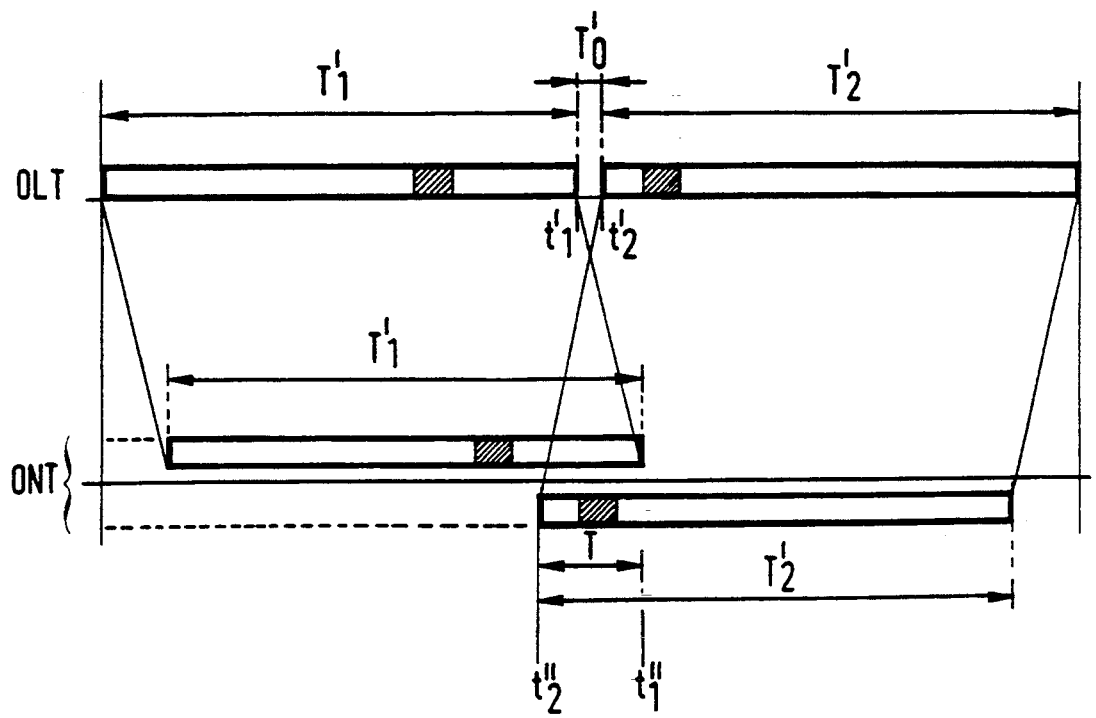
FIG. 2 is a diagram showing the transmission format employed in accordance with the invention in a half-duplex time division multiple access point-to-multipoint bidirectional transmission system.

In FIG. 2, $T'_1$ is the duration of the downward frame and $T'_1 > T_1$. $T'_2$ is the duration of the upward frame and $T'_2 > T_2$. $T'_1 = T'_2$, for example. $T'_0$ is the duration of a period that is not used to transmit information and $T'_0 < T_0$. In this example the duration $T'_0$ has a finite value but the method of the invention does not exclude a zero value for $T'_0$.

The method in accordance with the invention is based on the observation that, as the transmission system is of the time division multiple access type, as mentioned above, a remote station can be authorized to send while it is receiving information addressed to another remote station.

The present invention assumes that the directivity of the coupler used at said concentration point in the point-to-multipoint system considered is sufficiently high for signals reflected towards the other remote stations following any such sending by a remote station to be regarded as negligible.

The present invention also assumes that the clock recovery means in the receive part of a remote station are capable of continuing to provide said clock when reception is interrupted to carry out this sending.

In the example described the duration $T_0-T'_0$ is rendered usable for transmission of information by the method in accordance with the invention and is shared equally between the downward and upward frames.

As mentioned above, the invention applies to TDMA (Time Division Multiple Access) transmission, i.e. a transmission format structured in upward or downward frames comprising various time slots assigned in a predetermined manner to respective remote stations.

As shown schematically in FIG. 2, the method in accordance with the invention of allocating time slots allocates for transmission between the central station and a remote station at least one time slot in the downward frame and at least one time slot in the upward frame, the number of time slots to be allocated depending on the volume of information to be transmitted between the stations and, in the case of a plurality of time slots, each being allocated autonomously, by the method in accordance with the invention, so that the various time slots are not necessarily consecutive.

In the following description the various time slots are denoted by numbers using a numbering scheme in which:

in the central station numbers are assigned continuously in increasing order from an origin at the start of the downward frame and are common to the downward frame and to the upward frame (allowing for the period $T'_0$ when this is non-zero, of course), in a remote station:

for the downward frame numbers are assigned continuously in increasing order from an absolute origin at the start of the downward frame, for the upward frame there is a change of origin and numbers are assigned continuously in increasing order from a relative origin within the downward frame.

The origin time $t''_2$ of the upward frame in a remote station is determined such that the origin time $t'_2$ of this frame in the central station (i.e. allowing for the transmission time between the two stations) coincides with the start of the period $T'_2$. As shown in FIG. 2, this results in some overlap between downward and upward frames in the remote station. Let ID denote the number of the time slot in the downward frame which coincides with the first time slot of the upward frame. In the following description the overlap area T in FIG. 2 is the set of time slots of the downward frame having a number between ID and IU inclusive where IU is the number of the last time slot of the downward frame.

Note that the number ID varies for each remote station according to the transmission time between the remote station and the central station.

Determining ID entails measuring the transmission time $\Delta T$ between the remote and central stations and this can be done by a conventional method (not described here). The parameters $t''_2$, $t'_2$ and $\Delta T$ are related by the equation:

$$t''_2 + \Delta T = t'_2$$

Knowing $\Delta T$ and $t'_2$ for a given remote station it is therefore possible to determine $t''_2$ and therefore ID for that remote station.

In other words, the origin time $t''_2$ of the upward frames in a remote station is before the end time $t''_1$ of the downward frames in the same remote station and is separated from it by the period needed to obtain the required transmission format at the central station, in other words to enable reduction or even elimination of periods that cannot be used for transmission of information.

Let Id and Iu respectively denote a time slot number in the downward frame and a time slot number in the upward frame to be allocated for transmission between the central station and a given remote station using the numbering scheme described above for the remote stations.

In this example it is assumed that the method of allocating time slots is implemented at the central station and the first step is to assign a time slot number Id in the downward frame.

The only conditions that apply to the number Id are then that it is the number of a free (i.e. as yet unallocated) time slot and that its value is less than IU. Any number meeting these conditions may be used for the number Id.

Figure 3:
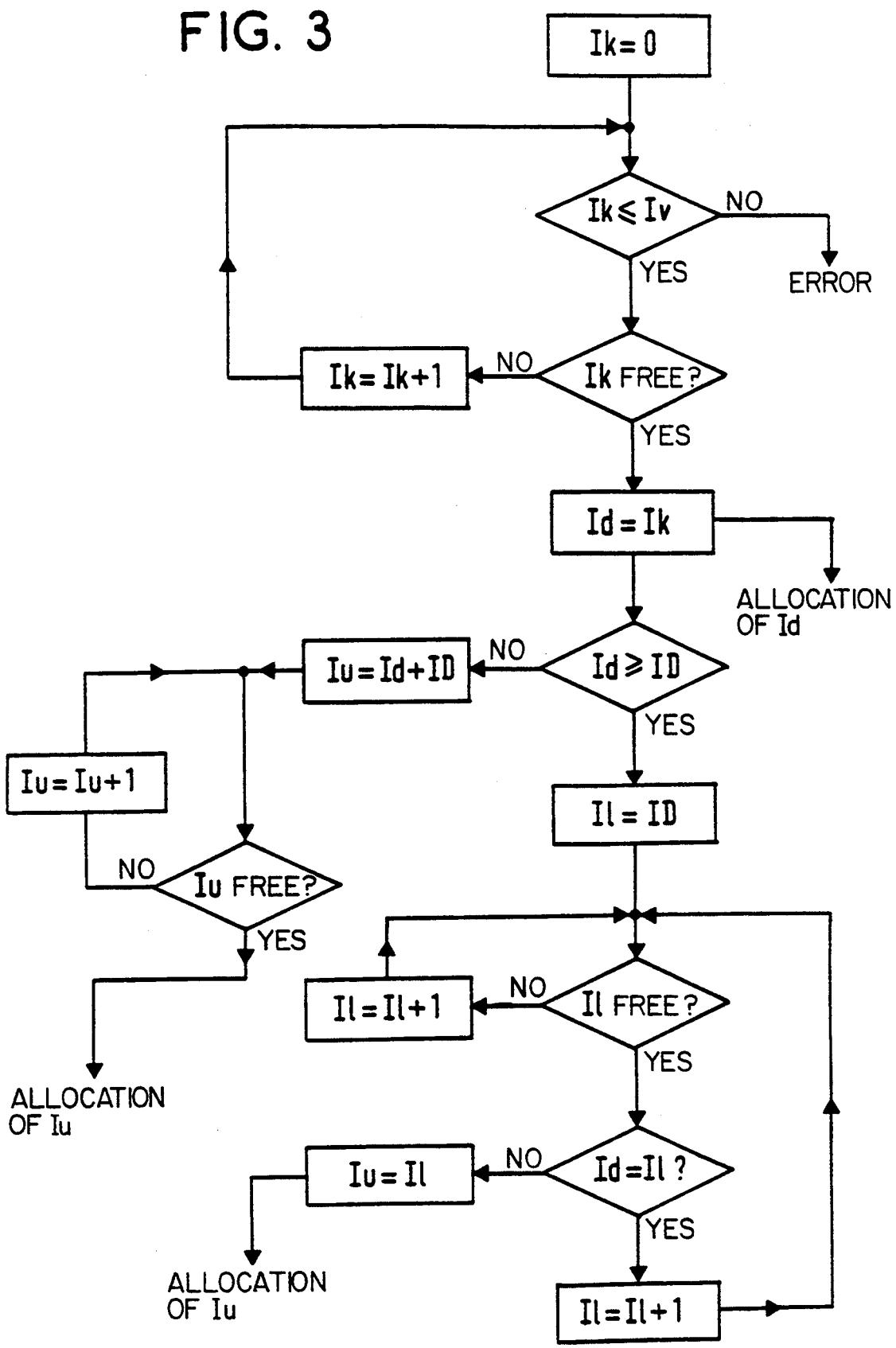
FIG. 3 is a flowchart showing the various stages of the method in accordance with the invention.

As shown in the FIG. 3 flowchart, for example, the number Id could be determined by successively considering the various time slots of the downward frame starting from the first, i.e. from that numbered zero in the FIG. 3 flowchart, and checking each time if it is available; if it is not available, the next is considered and if this is available its number can be used as the required number Id.

The process shown in the FIG. 3 flowchart utilizes an intermediate variable Ik which is incremented by unity each time an unavailable time slot is detected. Also as shown in the FIG. 5 flowchart, the detection of a number Ik greater than IU generates an error message.

A time slot number Iu in the upward frame is allocated as follows. The first step is to determine if the time slot corresponding to the number Id allocated in this way is in the overlap area or not by comparing the number Id with the previously defined number ID.

If it is not, the number Iu is advantageously determined in such a way as to retain symmetry of allocation of time slots in the downward and upward frames. Given the numbering scheme adopted for the remote stations, this is represented by the equation:

$$Iu = ID + Id$$

This number Iu can be retained as the required number Iu only if it is the number of a free time slot, however. If not, this number is incremented by unity, for example, and the availability test is repeated. This process is continued until a free time slot number Iu is obtained, as shown in the FIG. 3 flowchart.

If the time slot corresponding to the number Id thus allocated is in the overlap area it is necessary to check that a choice of the time slot Iu does not cause any send/receive collision and, given the numbering scheme adopted for the remote stations, this means that the numbers Iu and Id must be different.

The number Iu is determined, for example, by considering in succession the various time slots of the upward frame starting with the first, in other words, given the numbering scheme adopted for the remote stations, from that whose number is ID. Each time whether the time slot is available is determined and if it is not available the next is considered and if this is available it is checked to ensure that it is not identical to the previously assigned number Id. If the numbers are identical a subsequent time slot is considered but if they are not identical the number of this time slot may be retained as the required number Iu.

As shown in the FIG. 3 flowchart, this method utilizes an intermediate variable Il which is incremented by unity each time that an unavailable time slot is detected.

The method of allocating time slots described above can be implemented in the central station or in the remote stations but if it is implemented in the remote stations it is necessary to centralize the results at the central station and the central and remote stations must communicate to implement the method.

An advantageous application of the present invention is to the situation in which the period of duration $T'_0$ defined with reference to FIG. 2 is used as a location window to determine the transmission time between remote and central stations, in particular where this window has a relatively short duration, using the particular transmission time determination method now to be described.

The transmission time between a remote station and the central station is usually determined by measuring at the central station the time which elapses between a reference time at which information signals are sent by said central station and the time at which said central station receives a location signal transmitted by said remote station with a time-delay relative to a reference time at which said remote station receives said information signals determined in such a way that the various location signals sent by the various remote stations are received in a given period known as the location window which is not assigned to receiving information signals.

A relatively wide location window can be used covering all location signal intermediate positions between respective extreme positions representing the remote station nearest the central station and the remote station farthest from the central station.

As will now be described with reference to FIGS. 4 and 5, it is also possible to use a relatively narrow location window referred to as the reduced width window.

Let T denote the transmission period of the central station. Referring to FIG. 4, this transmission period includes a period assigned to sending and a period assigned to receiving. In the first line of the FIG. 4 diagram Te is the period for sending in the downward direction from the central station OLT to a plurality of "n" remote stations ONT1, ONT2, . . . , ONT8 (in this example n=8). FIG. 4 therefore shows two consecutive send periods Te1 and Te2.

In the embodiments described the transmission format in the downward direction comprises at least one time slot reserved for transmission of specific information signals addressed to all of the remote stations (these signals are referred to collectively as "signalling").

In these examples this signalling includes a signal for addressing one of the "n" remote stations in order to trigger sending by this remote station of a location signal SW. Unlike other signalling to be described hereinafter, the sending of these addressing signals is not subject to any condition; it is therefore systematic and cyclic, the "n" remote stations being addressed in turn, for example.

The time as measured by the central station at which a location signal is received relative to a reference time at which said central station sends indicates the transmission time between said remote station and the central station. This reference time $t_1$ is the end of the send period Te1, for example.

The location signal is sent by the remote station addressed in this way after a time-delay starting from a reference time for reception by said remote station. This reference time $t_2$ is the start of the period of reception by the remote station, for example, as shown in the fourth line of the diagram for station ONT3, for example.

This time-delay is variable from an initial value such that the respective location signal is not necessarily received in the reduced width location window Tf provided at the central station in the time period T−Te.

In the embodiments described the signalling further comprises a signal indicating non-reception of the location signal in the location window.

If the location signal is not received in this window, as indicated by this signal for indicating non-reception of the location signal in the location window, the next sending of the location signal by the remote station in question (triggered, as mentioned above, by an addressing signal) is effected with a different time-delay such that the location signal falls in said reduced width location window or at least moves closer to it. This time-delay is obtained by automatically incrementing the previous time-delay by a predetermined value equal to the time-delay variation increment, for example.

If the location signal is not received in the reduced width location window for the initial value of this time-delay, the period in which the location signal is received for this initial value and for any intermediate values between the initial value and the final value of the time-delay for which the location signal is received in this window is advantageously a time period not assigned to reception of information signals by the central station. This is to avoid any possibility of collision between information and location signals received by the central station and is valid regardless of the bidirectional transmission system used (using two separate media or half-duplex transmission on a single medium).

In the case of half-duplex bidirectional transmission on a shared medium for both transmission directions this period is advantageously a period assigned to sending by the central station. Problems related to collisions between information signals sent by the central station and location signals sent by a remote station can be solved by using in the central station send-receive coupling means such that the level of the location signals received by this station has no effect on the information signals sent by this station.

Figure 4:
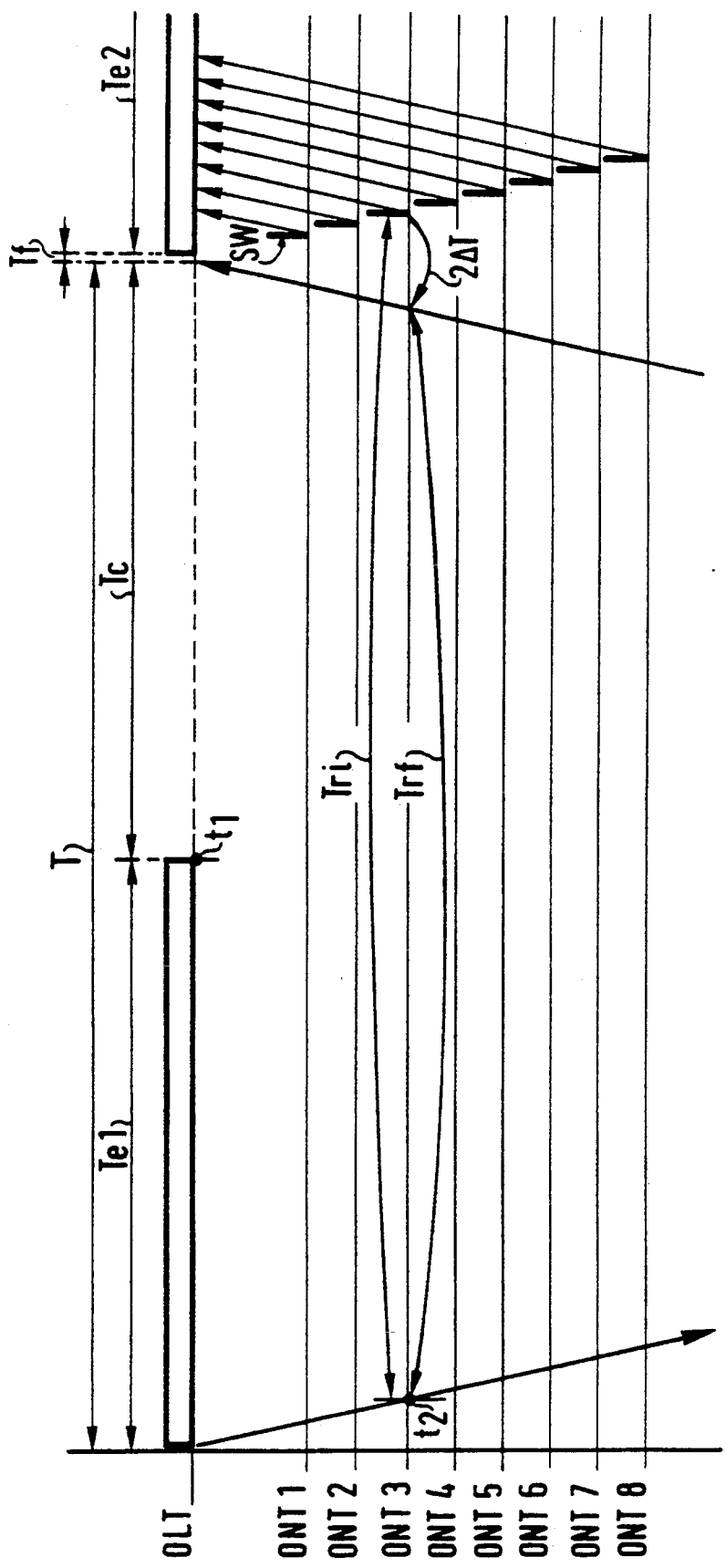
FIGS. 4 and 5 are diagrams illustrating a particular method of determining the transmission time between remote and central terminal stations respectively where a shared medium is used for both transmission directions and where two separate media are used for the opposite transmission directions, a method of this kind being advantageously used in conjunction with the method in accordance with the invention.

As shown in FIG. 4, this period assigned to sending by the central station is advantageously the period Te2 following that Te1 including the reference time $t_1$, the reduced width location window in this case immediately preceding the period Te2.

As shown in FIG. 4, the initial time-delay Tri is then advantageously equal to the duration T of the transmission period. In this case, regardless of the remote station concerned, the location signal is not received in the location window for this initial value and the time-delay is then varied, as shown in FIG. 4, by decreasing it from this initial value to a final value Trf.

It would be equally feasible to choose an initial time-delay value less than T in which case the time-delay would be varied by increasing it from this initial value.

It would also be feasible to use the period Te1 containing the reference time $t_1$ in question as the period assigned to sending and in which the location signal would fall for the initial and intermediate values of the time-delay, the reduced width location window immediately following this period Te1, for example.

In the case of half-duplex bidirectional transmission on a shared medium, the time-delay variation increment is advantageously equal to the width of the reduced width location window.

Figure 5:
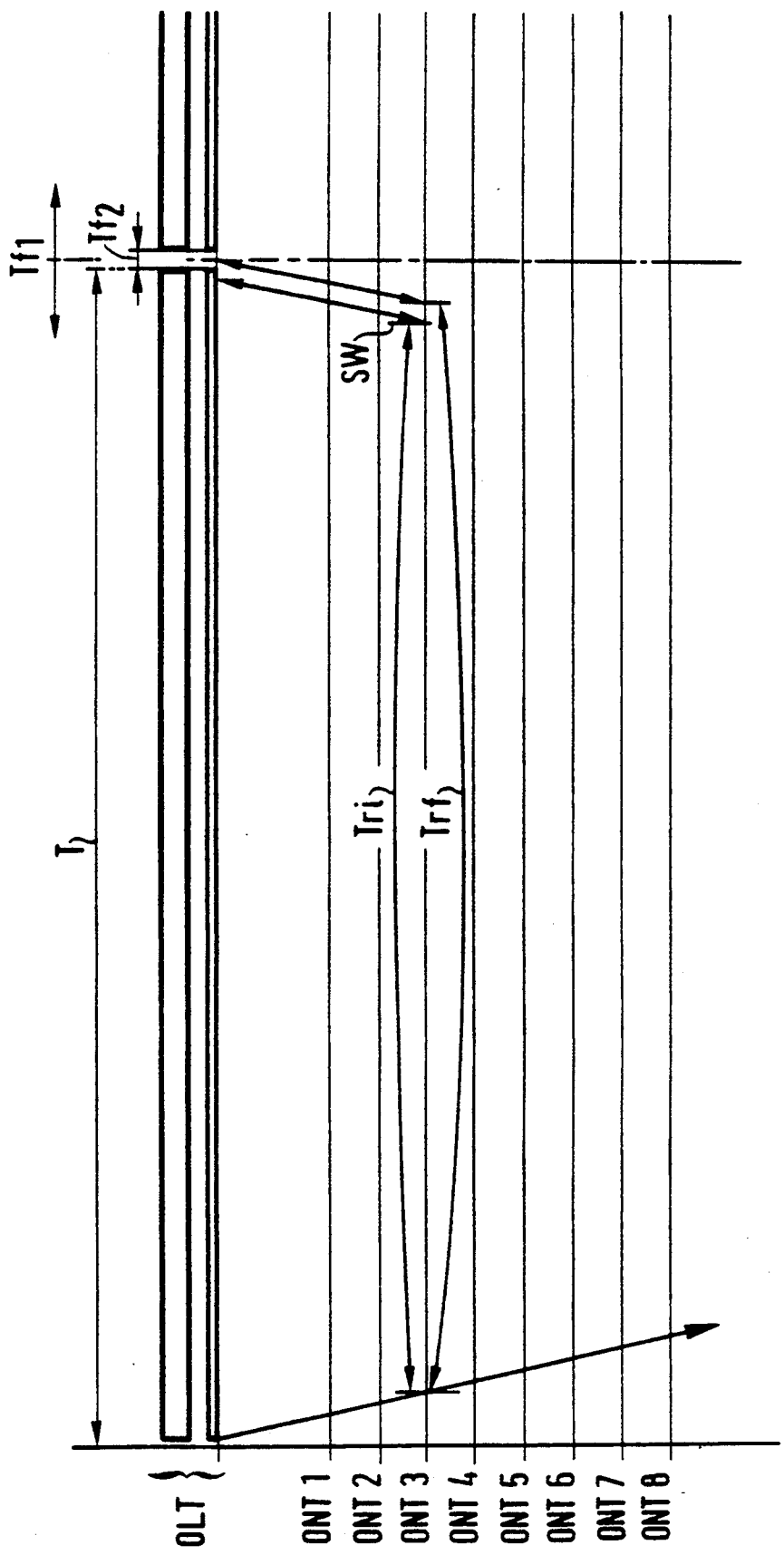

Referring to FIG. 5, in the case of bidirectional transmission using two separate media the periods Te and Tr for sending and receiving by the central station respectively shown on the first and second lines of the FIG. 4 diagram can occupy the total duration of the transmission period T excluding the width of the reduced width location window.

To reduce the time to determine the final value of the time-delay for which the location signal falls in the location window, the width of the latter is advantageously variable, and in this instance has a first width Tf1 in a first period and a narrower second width Tf2 in a second period. The time-delay variation increment has in a first period a first value advantageously equal to said first width and in a second period a second value less than the first and advantageously equal to said second width. For each of these periods the process is similar to that described previously for a single period and the changeover from the first period to the second occurs when the location signal is received in the location window whose width is said first width.

In all the examples considered the fact that the central station detects the location signal in the reduced width window (or in the narrower of the two reduced width windows in the last example referred to) is indicated to the remote station in question when it is next addressed by means of a specific signal indicating detection of the location signal in the location window. This remote station then sends the final time-delay value Trf to the central station which can then calculate the required transmission time $\Delta T$ using the following equation allowing for the reference times chosen:

$$2 \quad \Delta T = Te + Tc - Trf$$

in which Tc is the duration obtained after the counting carried out as described above in the central station and Te is the period for sending by the central station. Note that regardless of the reference times chosen, the calculation of the transmission time by this method requires:

measurement by the central station of the time interval between the reference time for sending of information signals by the central station and the time at which the central station receives a location signal sent by a remote station after a time-delay starting from the reference time for reception of said information signals by this remote station, this time-delay being determined so that the location signal is received in the location window concerned, and determination by said remote station of the final time-delay value Trf for which the location signal is received in this window.

If the transmission time is calculated in the central station the value Trf is transmitted by the remote station to the central station. The final time-delay value Trf may be transmitted by means of a specific information signal which is part of the signalling transmitted in the upward direction, for example.

In all the examples the level of said location signal is advantageously varied from an extreme (minimal or maximal) value to an intermediate value which varies depending on the remote station in question and produces substantially the same level at the central station for all the remote stations.

The direction of the variation to be applied for this purpose to the level at which the remote station sends the location signal is determined at the central station, for example, and transmitted to the remote station by a level variation control signal.

The level at which the location signal is sent may be controlled by any conventional means (not described here).

Note that the receiver at the central station may advantageously be chosen to have the greatest possible receive dynamic range so that it is able to receive any level sent by a remote station at any distance from the central station.

This requirement as to the quality of this receiver may be less constraining if the send level is varied by increasing it from a minimal value rather than reducing it from a maximal value.

Note further that the detection threshold of the receiver is advantageously relatively low to detect a location signal, in order to increase the probability of detecting any such signal, and relatively high to detect information signals, in order to optimize the conditions for reception of such information signals.

Note further that if the send level is varied by reducing it from a maximal value such variation may be applied once the location signal has been detected in the reduced width location window (or in the narrower of the two reduced width windows in the last example referred to above).

Note also that if the send level is varied by increasing it from a minimal value, depending on said minimal value, it may be necessary to vary the level not only to obtain substantially the same level at the central station for all the remote stations, as mentioned above, but also in order to be able to detect the location signal at the central station in the reduced width location window (or in the narrower of the two reduced width windows in the last example referred to above). Two conditions must then be met if a location signal is to be detectable in the location window concerned. One is that it is sent with an appropriate time-delay, as described above, and the other is that it is of sufficient level. For example, if the signal indicating non-reception of the location signal in the location window indicates that the signal has not been detected for a given time-delay value and a given level, all or part of the level variation range is systematically scanned (for example by systematically incrementing the previous level by a predetermined amount equal to the level variation increment) before moving on to the next time-delay value, if necessary.

There is claimed:

1. Method of allocating time slots for transmission in a half-duplex time division multiple access point-to-multipoint bidirectional transmission system enabling transmission between a central station and a plurality of remote stations, at least one time slot being allocated to each remote station and to each transmission direction, the set of all time slots used for transmission from said central station to said remote stations being grouped into downward frames and the set of all time slots used for transmission from said remote stations to said central station being grouped together in upward frames, in which method the origin time of said upward frames is chosen in each remote station so that in said central station the origin time of said frames is separated from the end time of downward frames by a period less than twice the transmission time between said remote station and said central station, whereby there is defined in said remote station an overlap area between upward and downward frames, said time slots being allocated in such a way as to avoid any coincidence between time slots allocated to the same remote station in the upward and downward frames, respectively, in said overlap area.

2. Method according to claim 1 wherein a first time slot is allocated to said remote station in said upward frames, and a second time slot is allocated to said remote station in said downward frames, one after the other in such a manner that, in the event that said second time slot is not in said overlap area, said first time slot is allocated in such manner as to achieve symmetry of allocation in said upward and downward frames.

3. Method according to claim 1 wherein a first time slot is allocated to said remote station in said upward frames, and a second time slot is allocated to said remote station in said downward frames, one after the other, and in the event that said second time slot is in said overlap area, said first time slot is allocated by searching for a time slot not previously allocated in the frames concerned and separate from said second time slot in said overlap area.

4. Method according to claim 2 wherein said first time slot allocated before said second time slot is allocated by searching for a time slot not previously allocated in the frames concerned.

5. Method according to claim 3 wherein said first time slot allocated before said second time slot is allocated by searching for a time slot not previously allocated in the frames concerned.

6. Method according to claim 3 wherein said search is effected by considering the various time slots of said frames successively.

7. Method according to claim 4 wherein said search is effected by considering the various time slots of said frames successively.

8. Method according to claim 1 wherein a first time slot is allocated to said remote station in said downward frames, and a second time slot is allocated to said remote station in said upward frames, one after the other in such a manner that, in the event that said second time slot is not in said overlap area, said first time slot is allocated in such manner as to achieve symmetry of allocation in said upward and downward frames.

9. Method according to claim 1 wherein a first time slot is allocated to said remote station in said downward frames, and a second time slot is allocated to said remote station in said upward frames, one after the other, such that, in the event that said second time slot is in said overlap area, said first time slot is allocated by searching for a time slot not previously allocated in the frames concerned and separate from said second time slot in said overlap area.

10. Method according to claim 8 wherein said first time slot allocated before said second time slot is allocated by searching for a time slot not previously allocated in the frames concerned.

11. Method according to claim 9 wherein said first time slot allocated before said second time slot is allocated by searching for a time slot not previously allocated in the frames concerned.

12. Method according to claim 9 wherein said search is effected by considering the various time slots of said frames successively.

13. Method according to claim 10 wherein said search is effected by considering the various time slots of said frames successively.

* * * * *